(12) United States Patent
Ravarini

(10) Patent No.: US 7,687,743 B2
(45) Date of Patent: Mar. 30, 2010

(54) APPARATUS AND METHOD FOR HEATING AND MELTING SOLID LUBRICANTS IN THE DELIVERY DRUM

(75) Inventor: Luigi Ravarini, Milan (IT)

(73) Assignee: Ravarini Castoldi & C. S.r.l. (IT)

( * ) Notice: Subject to any disclaimer, the term of this patent is extended or adjusted under 35 U.S.C. 154(b) by 973 days.

(21) Appl. No.: 10/569,029

(22) PCT Filed: Apr. 24, 2004

(86) PCT No.: PCT/EP2004/004360

§ 371 (c)(1),
(2), (4) Date: Feb. 17, 2006

(87) PCT Pub. No.: WO2005/040665

PCT Pub. Date: May 6, 2005

(65) Prior Publication Data

US 2006/0231340 A1    Oct. 19, 2006

(30) Foreign Application Priority Data

Oct. 23, 2003    (IT)    ............ MI2003A2071

(51) Int. Cl.
*H05B 1/02*    (2006.01)
*F16N 39/04*    (2006.01)
*F16N 15/00*    (2006.01)
*F16N 29/00*    (2006.01)

(52) U.S. Cl. .................. 219/494; 219/421; 219/426

(58) Field of Classification Search .......... 219/415, 219/418, 419, 420, 421, 423, 544, 548, 552, 219/553, 471, 494
See application file for complete search history.

(56) References Cited

U.S. PATENT DOCUMENTS

| 2,436,722 | A | * | 2/1948 | Liddell et al. | ............ 222/146.5 |
| 2,560,795 | A | * | 7/1951 | Harris | .................... 392/487 |
| 2,894,102 | A | * | 7/1959 | Morris | .................... 392/488 |
| 3,282,469 | A | * | 11/1966 | Skonberg | .............. 219/421 |
| 3,412,903 | A | * | 11/1968 | Van Riper, Jr. et al. | ...... 219/421 |
| 4,426,865 | A | | 1/1984 | Steinmetz et al. | |
| 4,534,493 | A | * | 8/1985 | Sedran | .............. 222/146.2 |
| 5,431,826 | A | * | 7/1995 | Becker et al. | .............. 210/742 |
| 6,046,437 | A | * | 4/2000 | Frates | .................. 219/426 |
| 6,157,776 | A | * | 12/2000 | Onken | .................... 392/441 |
| 7,211,770 | B2 | * | 5/2007 | Wilson | .................. 219/439 |

FOREIGN PATENT DOCUMENTS

| DE | 2032786 B | * | 4/1977 |
| EP | 140844 A2 | * | 5/1985 |
| GB | 14834 | | 10/1912 |
| GB | 141930 | | 4/1920 |
| GB | 710102 | | 5/1951 |

* cited by examiner

*Primary Examiner*—Geoffrey S Evans
(74) *Attorney, Agent, or Firm*—Robert W. Becker; Robert Becker & Associates

(57) ABSTRACT

An apparatus for heating and melting solid lubricants in a delivery drum, including a heating element composed of armored resistors shaped as concentric rings and junction spokes. A hoist lowers and raises the heating element into and out of the drum via vertical rods that are not heated. A first thermal sensor is connected with the heating element, and a second thermal sensor is mounted on the vertical rods. A transfer pump withdraws melted lubricant from the drum via a suction tube having a bottom valve at its foot. A lubricant delivery tube is connected to the output side of the pump.

6 Claims, 1 Drawing Sheet

APPARATUS AND METHOD FOR HEATING AND MELTING SOLID LUBRICANTS IN THE DELIVERY DRUM

This specification for the instant application should be granted the priority date of Oct. 23, 2003, the filing date of the corresponding Italian patent application MI2003A002071 as well as the priority date of 24 Apr. 2004, the filing date of the corresponding International patent application PCT/EP2004/004360.

BACKGROUND OF THE INVENTION

The present invention relates to an apparatus and related method for heating and melting solid lubricants (Hot-Melts) in the delivery drum, to allow their transfer by pumping into the containers for servicing oiling machines, specifically electrostatic ones.

Solid lubricants for laminates, known also as "Hot Melts", "Dry-film", "Dry-lube", etc. are solid products at room temperature and their melting point is in the order of 30+50° C.

They are usually delivered in metal drums capable of being fully opened, into which they were poured by the manufacturer.

For their use in electrostatic oiling machines, they must be liquefied by heating beyond the melting point.

This can be obtained in various known manners, for instance using electric shell drum heaters, or introducing the drums themselves into heated chambers and leaving them therein until the content is fully melted.

It is then necessary to move the warm drums and transfer their content into the thermostatic service containers of the oiling machines.

However, this operation is not only impractical, it also requires very long times and a great expenditure of energy.

This is due to the fact the heat conductivity of the solid mass of the lubricant is very poor and therefore the energy applied to the exterior of the container (shell heaters, hot chambers) penetrates very slowly into the mass.

The product near the walls of the drum melts rather rapidly, but the temperature within the solid mass rises at an extremely slow rate, because of the poor heat conductivity of the product and of the absence of convective currents.

The present invention aims to reduce the time required for melting and facilitate transferring the product.

SUMMARY OF THE INVENTION

According to the present invention, heating bodies are set down on the upper surface of the solid mass and—progressively sinking into it—they bring thermal energy directly into the core of the mass itself.

As the product melts around the heating bodies, it is animated by convective motions which in turn effectively transmit heat to the adjacent solid mass with progressive expansion of the exchange surface. The liquefaction process thus extends at a growing rate to the entire mass contained in the drum.

When melting is completed, a pump, having its body heated, draws the product from the drum and sends it—through a pipeline, which is also heated—to the service container of the oiling machine.

BRIEF DESCRIPTION OF THE DRAWINGS

The apparatus according to the invention described hereafter with reference to FIGS. 1 and 2 is an effective practical embodiment of these principles. In the drawing.

DESCRIPTION OF SPECIFIC EMBODIMENTS

Figure 2:
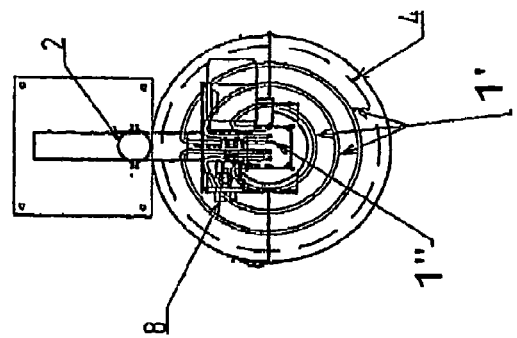
FIG. 2 is a plan view onto the arrangement of FIGS. 1a and 1b.
Figure 1B:
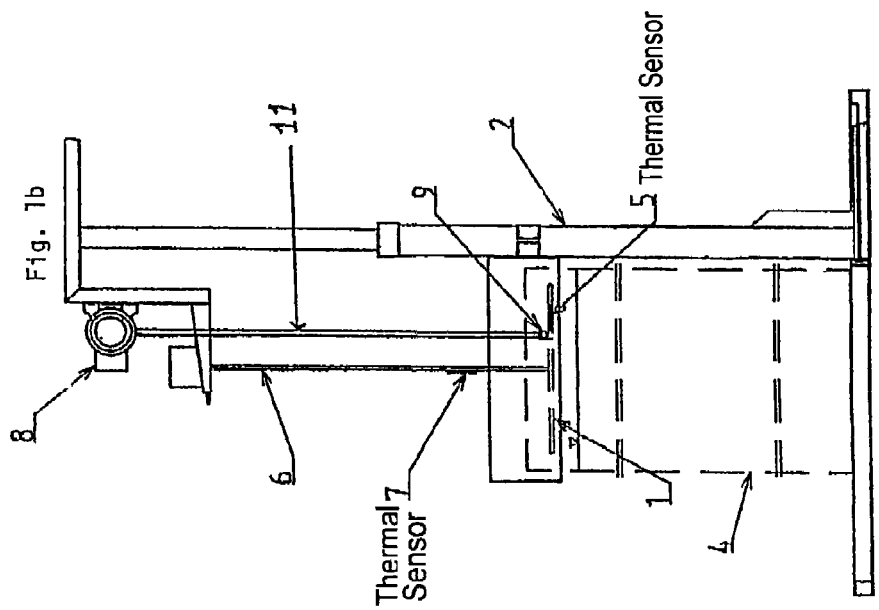
FIG. 1b shows the heating element raised out of the product drum.
Figure 1A:
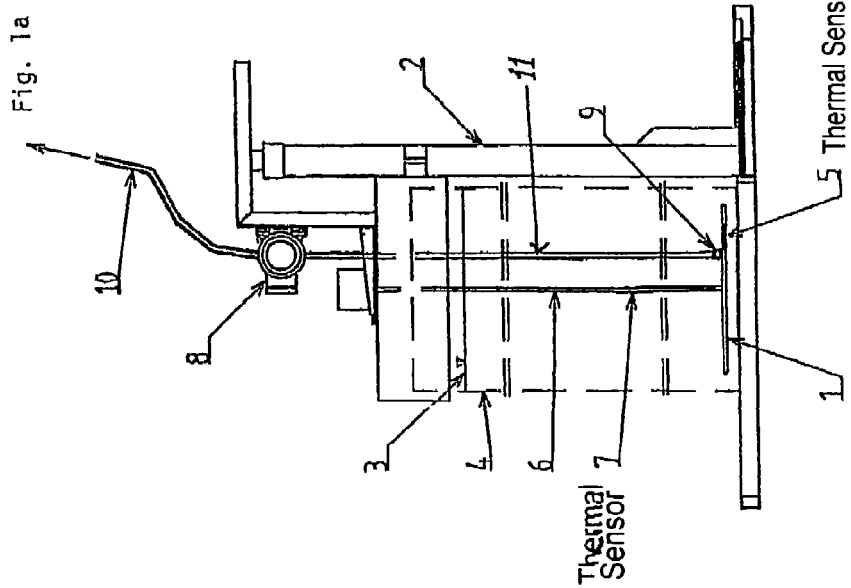
FIG. 1a shows the heating element having reached the bottom of the product drum.

The apparatus according to the invention described hereafter with reference to FIGS. 1 and 2 is an effective practical embodiment of these principles.

A heating element constituted by armored resistors shaped as concentric rings and junction spokes 1 borne by a hoist 2 is set down onto the upper surface of the product 3 to be melted contained in the original drum of the product 4. The heating element is subjected to the thrust deriving from its own weight and that of the connected movable masses (rod of the hoisting cylinder, load-bearing arms, transfer pump, suction tube, etc.).

At this point the heating element is powered, controlling its temperature by means of a heat sensor 5 applied thereto, at a value T1 sufficient for melting but such as to avoid a harmful local overheating of the product.

The vertical rods 6 that connect the heating elements to the load-bearing arm are not heated: since they remain outside the product for a long time, if they were heated then they would rapidly reach very high surface temperatures, such as to damage the product when they entered it.

Under the effect of the heating and of gravity, the heating element starts to sink into the mass that progressively melts around it. The liquefied product—agitated by convective currents—carries the heat and in turn transfers it to the surrounding solid surfaces with a multiplying effect.

When the heating element reaches the bottom dead center of its travel and is near the bottom of the drum, the entire mass is liquefied with the exception of a few residual nuclei.

The heating element is therefore kept at the temperature T1 for an additional time, in order to allow the entire mass to melt. At this point, temperature control passes to a second sensor 7 mounted on the vertical rods at about one third of their length starting from the bottom, which regulates the maintenance temperature T2. The value T2 is selected slightly above the melting temperature of the product. The product can remain at this temperature T2 even for long times without undergoing any alteration of any kind.

When all the product is liquid, the transfer pump 8 can be started manually or as a result of a command originating from the automation system.

The tube for the delivery of the product 10 is heated for example by circulation of a diathermic fluid within a jacket positioned coaxially.

By way of example, the pump can be started when the signal that the product is totally liquefied and the signal of minimum level in the related service container are both present simultaneously.

The pump is stopped after a time corresponding to the transfer of the entire capacity of the drum. A bottom valve 9 mounted at the foot of the suction tube 11 prevents it from emptying, facilitating the priming of the pump in subsequent operations.

When the drum is empty, the hoist is raised to the top dead center (see FIG. 1b) with a manual command. The empty drum can thus be replaced with a full one and the entire operation can be repeated for a number of times n.

Melting times depend on the heat capacity and on the melting point of the product to be treated, as well as—obviously—on ambient temperature.

By way of example, with ambient temperature 15° C. and melting point of the product of 45° C., the entire content of the drum is melted in about 5 hours with a power of 3 kW and a temperature of the heating element of 90° C.

At equal ambient temperature, using a conventional electrical drum heater (shell plus bottom) having a power of 5.5 kW and working temperature of 120° C., the time for the complete melting of a drum of Hot-Melt is about 18 hours. Similar times are required by heated chambers. Aside from any energy and economics-related considerations, this length of time is unacceptable.

An oiling machine applying 1 g/m² of Hot-Melt on the two surfaces of a 1500 mm wide metal strip at an average speed of 150 m/min. consumes:

2 ×1.5 mm ×1 g/m² ×150 m/min −450 g/min −0.5 1/min. Therefore, a 200 liter drum is consumed in 400 min, i.e. in less than 7 hours.

Hence, a single-drum heating and melting station would not assure the continuous operation of the line.

The present invention instead assures the continuous operation in most practical cases, with very modest energy requirements.

The specification incorporates by reference the disclosure of Italian priority document MI2003A002071 filed Oct. 23, 2003 and PCT/EP2004/004360 filed Apr. 24, 2004.

The present invention is, of course, in no way restricted to the specific disclosure of the specification and drawings, but also encompasses any modifications within the scope of the appended claims.

LIST OF REFERENCES 1 heating element
2 hoist
3 upper surface of the product
4 drum of the product
5 thermal sensor
6 vertical rods
7 maintenance sensor
8 transfer pump
9 bottom valve
10 pre-heated delivery tube
11 suction tube

The invention claimed is:

1. An apparatus for heating and melting a solid lubricant mass in a delivery drum (4), comprising:
   a heating element (1) composed of armored resistors shaped as concentric rings (1') and junction spokes (1");
   a hoist (2) adapted to lower and raise said heating element into and out of said drum (4);
   at least one vertical rod (6) that connects said heating element to components of said hoist;
   a first thermal sensor (5) operatively connected with said heating element (1) kept at a temperature T1 controlled by means of said first thermal sensor;
   a second thermal sensor (7) mounted on said at least one vertical rod (6) which regulates a maintenance temperature T2 when temperature control from first thermal sensor (5) passes to said second thermal sensor after an additional time in order to allow the entire solid lubricant mass to melt;
   a transfer pump (8) for withdrawing melted lubricant from said drum (4) via a suction tube (11);
   a bottom valve (9) mounted at the foot of said suction tube (11); and
   a lubricant delivery tube (10) connected to an output side of said pump (8),
   wherein said first thermal sensor is configured to control the temperature of said heating element at a melting temperature and said second thermal sensor is configured to thereafter control the heating element at a maintenance temperature, wherein said temperatures are predetermined for melting and maintaining liquefying said lubricant but are such as to prevent harmful overheating thereof.

2. An apparatus according to claim 1, wherein said heating element (1) is subjected to thrust derived from its own weight and the weight of movable masses of said vertical rods (6), components of said hoist (2), said transfer pump (8) and said suction tube (11).

3. An apparatus according to claim 1, wherein said delivery tube (10) is coaxially disposed in a jacket, and wherein a diathermic fluid is adapted to circulate within said jacket for heating said delivery tube.

4. A method of operating an apparatus for heating and melting a solid lubricant mass in a delivery drum, the apparatus comprising a heating element composed of armored resistors shaped as concentric rings and junction spokes; a hoist adapted to lower and raise said heating element into and out of said drum; at least one vertical rod that connects said heating element to components of said hoist; a first thermal sensor operatively connected with said heating element kept at a temperature T1 controlled by means of said first thermal sensor; a second thermal sensor mounted on said at least one vertical rod which regulates a maintenance temperature T2 when temperature control passes from first thermal sensor to said second thermal sensor after an additional time in order to allow the entire solid lubricant mass to melt; a transfer pump for withdrawing melted lubricant from said drum via a suction tube; a bottom valve mounted at the foot of said suction tube; and a lubricant delivery tube connected to an output side of said pump, the method including the steps of:
   positioning the heating element on an upper surface of the solid lubricant contained in the drum such that the heating element progressively sinks into the solid lubricant mass and reaches the bottom of the drum, thereby liquefying the entire solid lubricant mass; and
   controlling the temperature of said heating element by means of said first thermal sensor at a melting temperature and thereafter of said second thermal sensor at a maintenance temperature, wherein said temperatures are predetermined for melting and maintaining liquefying said lubricant but are such as to prevent harmful overheating thereof.

5. A method according to claim 4, wherein after said heating element (1) has reached the bottom of said drum upon at least substantial melting of the entire mass of said lubricant, said first thermal sensor keeps said heating element at said melting temperature for an additional predetermined time until the entire mass of said lubricant is melted.

6. A method according to claim 5, wherein temperature control for the additional predetermined time passes to said second thermal sensor (7) which is mounted on said at least one vertical rod (6) at approximately one third of its height as measured from the bottom thereof, and wherein after the entire mass of said lubricant has been melted, said second sensor keeps said heating element at said maintenance temperature.

* * * * *